United States Patent [19]

Egerton et al.

[11] Patent Number: 5,002,646
[45] Date of Patent: Mar. 26, 1991

[54] METHOD FOR MAKING TITANIUM NITRIDE

[75] Inventors: Terence A. Egerton; Anthony G. Jones, both of Stockton on Tees; Stephen R. Blackburn, Middlesbrough, all of England

[73] Assignee: Tioxide Group PL.C.

[21] Appl. No.: 340,790

[22] Filed: Apr. 20, 1989

[30] Foreign Application Priority Data

Apr. 23, 1988 [GB] United Kingdom ............... 8809651

[51] Int. Cl.$^5$ .................... C01B 21/00; C01B 21/076; C01B 21/30
[52] U.S. Cl. .................................... 204/177; 204/178; 423/411
[58] Field of Search ................ 423/411; 204/177, 178

[56] References Cited

U.S. PATENT DOCUMENTS

| 2,413,778 | 1/1947 | Olson ................................. 423/411 |
| 2,952,599 | 9/1960 | Suchet ................................ 204/177 |
| 3,345,134 | 10/1967 | Heymer et al. ....................... 423/411 |
| 3,591,338 | 7/1971 | Roberts .............................. 423/411 |
| 3,657,089 | 4/1972 | Takahashi et al. ................... 204/177 |
| 4,022,872 | 5/1977 | Carson et al. ....................... 423/411 |
| 4,080,431 | 3/1978 | Moss .................................. 423/411 |
| 4,851,206 | 7/1989 | Boudart et al. ...................... 423/411 |

FOREIGN PATENT DOCUMENTS

| 60-051616 | 3/1985 | Japan . |
| 59-076802 | 9/1987 | Japan . |
| WO89/03810 | 5/1989 | PCT Int'l Appl. . |
| 787516 | 12/1957 | United Kingdom ............... 423/411 |
| 1199811 | 7/1970 | United Kingdom ............... 423/411 |
| 2167395 | 5/1986 | United Kingdom . |

OTHER PUBLICATIONS

V. N. Troitskii et al., "Use of a Superhigh Frequency Discharge for the Manufacture of Titanium Nitride Powder", Sov. Powder Metall. & Metal Ceram., (U.S.A.), vol. II, No. 3 (III), (Mar. 1972), pp. 176–178.
Chemical Abstracts, vol. 75, 65714d, 1971.

Primary Examiner—Wayne A. Langel

[57] ABSTRACT

A method which comprises the manufacture of black titanium nitride which comprises heating ammonia and titanium halide by means of an electric plasma formed in a stream of non-oxidizing gas generated by the discharge of direct current electricty between a pair of electrodes. The heated gases are introduced through an inlet nozzle into a reactor so constructed and operated as to induce circulation of the gases with a specifically defined recirculation ratio.

12 Claims, 3 Drawing Sheets

METHOD FOR MAKING TITANIUM NITRIDE

This invention relates to nitrogen compounds and particularly to nitrides of titanium.

Various compounds of nitrogen and titanium have been described and generally speaking these have been obtained by one of two general methods. The methods have either involved using a high temperature vapour phase process or not. Those processes which do not involve a high temperature vapour phase process generally produce a coarse titanium nitride product usually brown and typically of a particle size producing a surface area of the order of 3 meters squared per gram after intensively milling which also introduces metal contaminants such as iron or tungsten.

Smaller particle sized products can be obtained by other high temperature vapour phase methods of production but these invariably contain amounts of oxygen and/or chlorine exceeding 15% by weight.

A new product having desirable properties has now been produced which posseses a controlled fine particle size and an amount of oxygen within clearly defined limits.

According to the present invention a finely divided black powder comprises titanium nitride having a specific surface area as determined by BET measurements of from 10 to 80 meters squared per gram and containing oxygen in an amount of 1 to 10 per cent by weight on total weight of product.

Generally speaking the black powders of the present invention contain compounds of titanium, nitrogen and oxygen as essential constituents and optionally compounds of other elements derived from additions of appropriate halides made during the manufacturing process. Such other elements include silicon, boron, zirconium, aluminium and tin and possibly some halogen e.g. chlorine and each element may be present in the black powder up to a concentration of 15% by weight although the total concentration of elements other than titanium, nitrogen and oxygen will not exceed 15% by weight. Preferably, the total weight of elements other than titanium, nitrogen and oxygen does not exceed 5% by weight.

The amounts of titanium and nitrogen need not necessarily correspond with titanium nitride of precise chemical composition and indeed the amounts may vary over substantial ranges. Generally the amounts may correspond to titanium nitrides of empirical formula $Ti_xN_y$ where the molar ratio x to y is within the range 0.85 to 1.25 and preferably 0.90 to 1.20.

The black powder contains oxygen, as hereinbefore described, in an amount within the range of 1 to 10 weight per cent on total weight of product. In some samples of product examined by surface analysis (e.g. X-ray photoelectron spectroscopy) the oxygen has been found to be predominantly at the surface of the titanium nitride particles, although X-ray diffraction revealed no evidence of a separate titanium oxide phase.

The amount of oxygen and of titanium and nitrogen depends on that which is desirable for the ultimate use of the product as does any specific particle size of the product and further information on this aspect will be given hereinafter.

According to the present invention also a method for the manufacture of black titanium nitride comprises heating ammonia and a halide of titanium to a chosen reaction temperature by means of an electric plasma formed in a stream of non-oxidising gas generated by the discharge of direct current electricity between a pair of electrodes, introducing said heated gas through an inlet nozzle into a reactor and said reactor being so constructed and operated so as to induce circulation of the gaseous material in said reactor such that the recirculation ratio (RR) is greater than 2.5 and collecting a black titanium nitride powder in which method the recirculation ratio is defined according to the formula $$RR = \frac{0.425 \, Mn \cdot R}{M \cdot Rn} \left[ \frac{D}{Dn} \right]^{\frac{1}{2}} - 0.425$$

wherein
- RR = recirculation ratio
- Mn = mass flow rate of gas stream through inlet nozzle
- R = internal radius of the reactor into which said nozzle flows
- M = mass flow rate at a distance 4R downstream from inlet nozzle
- Rn = radius of inlet nozzle
- Dn = density of gas stream passing through the inlet nozzle
- D = density of gases in reactor at a distance 4R downstream from the inlet nozzle.

When the reactor is not of constant internal radius then the formula may still be used as an approximation using a mean value of the radius R.

As a further approximation densities are calculated neglecting reaction and dissociation.

Usually the concentration of titanium halide without considering reaction or dissociation lies in the range 5 to 30% and preferably 7 to 25% molar of the total gas stream.

In the Drawings, FIG. 1 is a diagrammatic representation of the reactor employed to carry out the process of the present invention.

Figure 1:
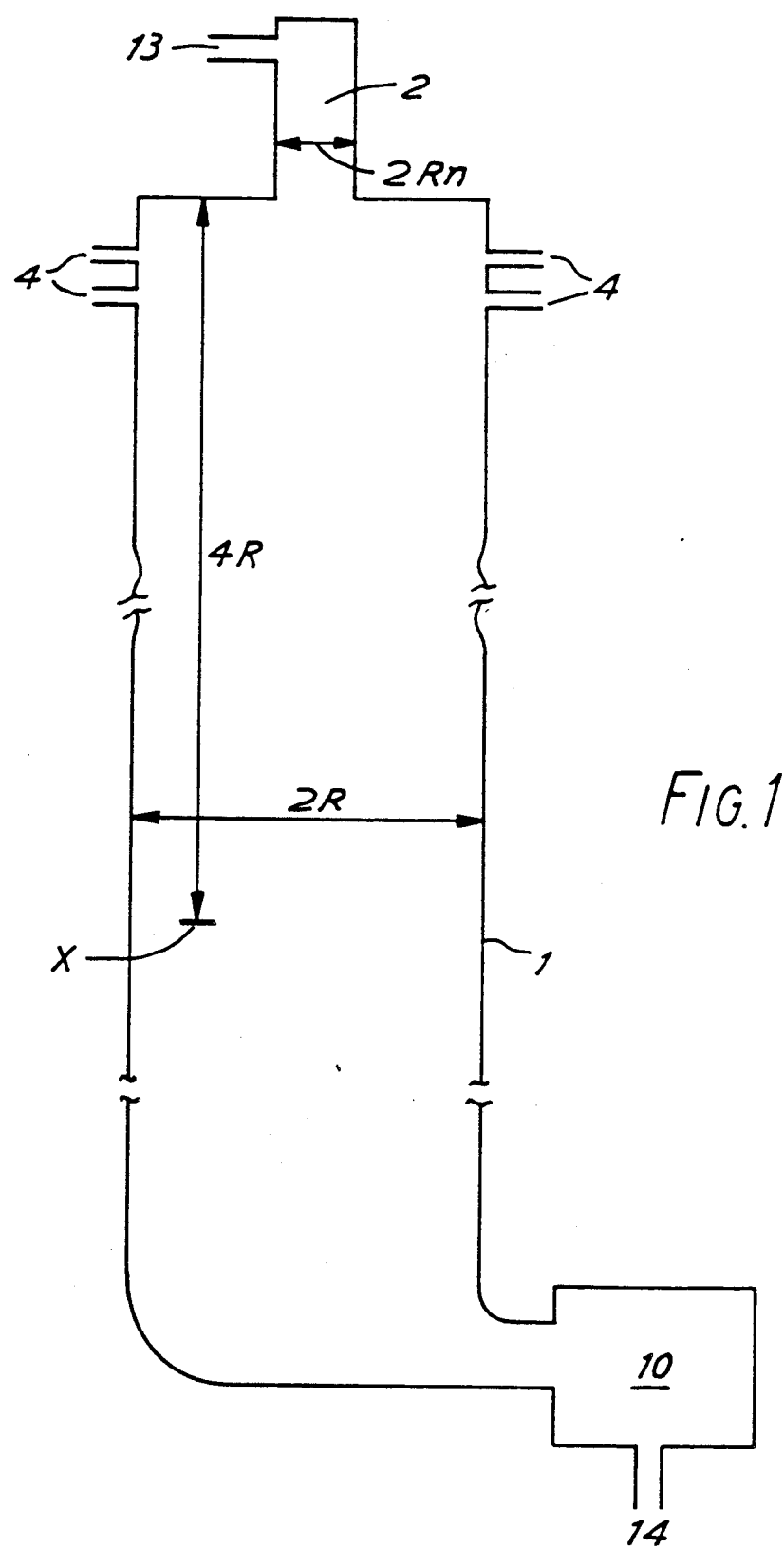

A diagrammatic representation of the reactor is shown in FIG. 1. of the attached drawings. In the drawing the reactor 1 is of cylindrical shape and has a constant internal radius (R) along its length. The heated gas stream is introduced via inlet 13 through a nozzle 2 of internal radius Rn. A number of inlets 4 are provided for the reactants. The drawing shows the point X at a distance of 4 reactor radii along the reactor from the inlet nozzle and a means 10 of separating the product which is discharged at point 14.

The reactants are heated to an appropriate temperature by the stream of a gas which is a non-oxidising gas such as an inert gas e.g. argon or nitrogen or hydrogen. This gas is heated by passing between a pair of electrodes supplied with a direct electric current at an appropriate level of power sufficient to introduce into the gaseous plasma thereby produced in the reactor sufficient heat energy to heat the reactants to the reaction temperature necessary. The power introduced into the gaseous plasma introduced through the inlet jet depends on various parameters and it is desirable to provide a net power in the plasma of 50 to 500 kcals per minute per mole of titanium halide.

A wide range of voltages and currents can be used. Typically, however, voltages of the D.C. supplied can range from 25 to 50 V with argon and from 90 to 250 V and preferably 90 to 220 V with nitrogen or hydrogen and the current from 200 amps to 600 amps with argon and from 80 amps to 250 amps with nitrogen and hydrogen.

The reactants are a titanium halide and ammonia. Typical halides are the flourides and chlorides with titantium tetrachloride being preferred. The reactants are introduced separately into the reactor in the region of the gaseous plasma through one or more inlets. The flow rate used will depend upon the power introduced to the gaseous plasma but typical rates are 0.1 to 5.0 mole per minute for titanium halide and 0.2 to 50.0 mole per minute for ammonia.

The reactor is constructed and operated so that the recirculation ratio as defined hereinbefore has a value of at least 2.5. The ratio does not normally exceed 10 with a range of values of from 3 to 9 being preferred.

As explained hereinbefore the precise composition desired in the product of the invention does depend somewhat on its eventual use and the product may include other elements than titanium, nitrogen and oxygen. The reactants may include added other metal or non-metal halides e.g. silicon chloride, boron chloride, zirconium chloride, aluminium chloride or tin chloride as desired. These may be added directly to the reactor or premixed with one or more of the reactants.

After reaction the product of the invention can be removed from the gas stream by any suitable filtration technique either before or after cooling. Fabric filter cloth in the form of bag can be used as can a ceramic filter pre-heated if necessary. A scrubber supplied with a fluid can be used if desired and conveniently it has been found that scrubbing the gas stream with hydrochloric acid containing up to 20% HCl is a suitable technique.

Figure 2:
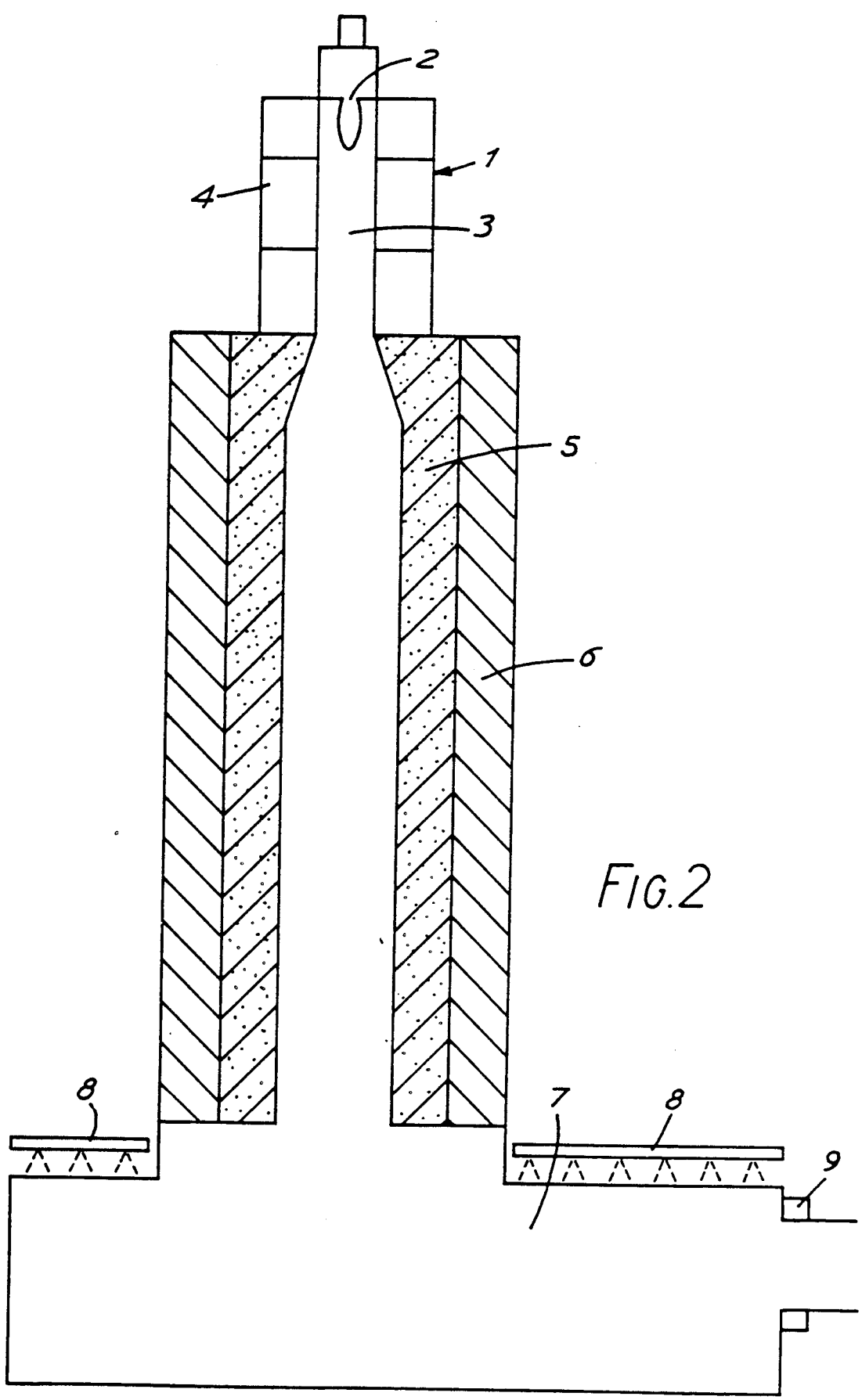
FIG. 2 is a part diagrammatic sectional view of a reactor and primary cooling section employed in the present invention.
Figure 3:
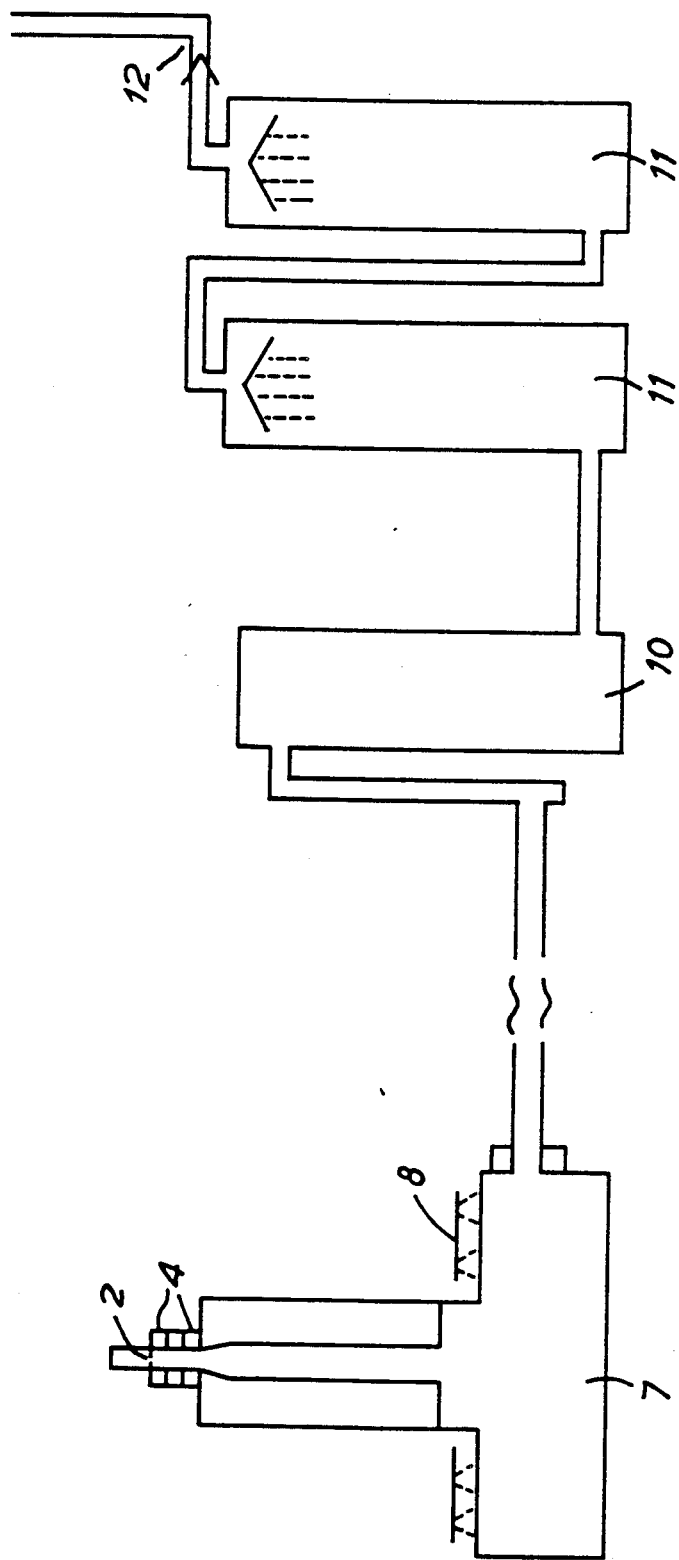
FIG. 3 is a diagrammatic view of the apparatus of FIG. 2 and associated scrubbers.

One particular apparatus for carrying out the process of the invention will now be described by way of example only with reference to the accompanying drawings in which FIG. 2 is a part diagrammatic sectional view of a reactor and primary cooling section, and FIG. 3 is a diagrammatic view of the apparatus of FIG. 2 and associated scrubbers. As shown in FIGS. 2 and 3 the reactor 1 is heated by means of a plasma flame from a nozzle 2 of a plasma gun through which a non-oxidising gas flows. The reactants (e.g. titanium tetrachloride and ammonia) are introduced into the initial reaction zone 3 through burner rings 4 constructed from nickel.

The hot gases then pass into a further reaction zone constructed from high alumina cement 5 insulated by a layer of insulating cement 6 from which they emerge into a primary cooling zone 7 constructed from steel and cooled by water sprays 8.

As the reactants leave cooling zone 7 they are quenched with nitrogen by means of a perforated aluminium quench ring 9 and they pass into the filter bank 10 in which the product is separated from the waste gases. Acidic waste gases (e.g. HCl) are removed by the two scrubbers 11 before discharge to atmosphere. The flow through the scrubbers 11 is maintained by an air venturi 12.

The products of the invention can be used in a wide variety of ways. The product can be used as a black pigment for inks, paints, plastics and cosmetics and also as an electrically conductive additive to these products which find use in electro-magnetic interference screening or in anti-static uses. The product can also be used as an electro conductive additive to ceramic materials based on silicon nitride, zirconia or alumina to facilitate electro-discharge machining or to prepare heating elements. In addition the product improves the hardness and strength of sintered ceramics e.g. carbides, which may be used as cutting tools. The products can also be used to coat other objects e.g. extrusion dies to improve the wear resistance and also to provide decorative coatings on objects. The products can also be used as an abrasive cleaner and anti-static additive for magnetic recording tapes. The products can also be sintered without the use of additives to form ceramic objects which have a golden lustre suitable for use as jewellery or ornamentation. Sintered pieces may be used as electrodes or sputtering targets and may thus be used to produce lustrous golden coatings.

When the product is to be used as a conductive additive then preferably the product contains 1 to 4% oxygen by weight and has a surface area of from 10 to 35 meters squared per gram and most preferably 1.5 to 3% oxygen by weight and a surface area of 15 to 30 meters squared per gram.

When the product is to be used as a black pigment or in ceramics then preferably the product contains oxygen in an amount of from 4 to 10 per cent by weight most preferably from 6 to 10 per cent by weight and has a surface area of from 35 to 80, preferably 50 to 80 meters squared per gram.

The invention is illustrated in the following Examples.

The values for oxygen content quoted are those determined on freshly prepared product. Further oxidation and/or hydrolysis may occur during prolonged exposure to air and/or water especially at elevated temperatures.

EXAMPLE 1

A d.c. plasma was established in argon flowing at a rate of 3.4 mole/min through a pair of electrodes supplied with direct electric current at 39.5 volts and 525 amps. When the reactor positioned below the plasma inlet has stabilised in temperature titanium tetrachloride at a rate of 1.0 mole per minute and ammonia gas at 3.5 mole per minute were fed into the area surrounding the tail flame of the plasma. The plasma introduced heat into the reactor at a rate of 145 kcal per minute (10.2 kwatt). The concentration of the titanium tetrachloride was high (12.0%) and the various variables in the equation determining the recirculation ratio had values of $Mn=136$ g/min; $M=402$ g/min; $Rn=3$ mm; $R=55$ mm; $Dn=5.5\times10^{-5}$ gcm$^{-3}$; and $D=3.7\times10^{-4}$ gcm$^{-3}$.

The recirculation ratio was 6.4.

The product was removed from the gas stream by filtration in a scrubber containing aqueous HCl (15%) and had a surface area (BET) of 23 meters squared per gram with an oxygen content of 1.7 per cent by weight.

The product prepared above has advantages as an electrically conducting additive compared to titanium nitride powders prepared by other routes as demonstrated by the following comparison.

Powder from Example 1 was compared with powder A prepared by nitridation of titanium metal (surface area 3 meters squared per gram, oxygen content 0.6 per cent). Each powder at 25 weight per cent addition level was ball-milled with silicon nitride and magnesia (1 per cent) in propan-2 ol for 2 hours. The mixtures were dried in air and hot pressed under 20 MPa of nitrogen at 1700° C. for 15 minutes.

The electrical resistivity of the sintered pieces was found to be $1.6 \times 10^9$ ohm meters for 25% powder A and $4.4 \times 10^{-2}$ ohm meters for 25% product of Example 1.

The product of Example 1 also shows advantages over titanium nitrides prepared by other routes in fabricating dense ceramic bodies whether by hot pressing or by pressureless sintering.

EXAMPLE 2

A d.c. plasma in argon introducing heat energy at 184 kcal/min (12.9 kwatts) into a reactor was established. Titanium tetrachloride at a rate of 1.6 mole per minute and ammonia gas at a rate of 5 mole per minute were fed into the area of the tail of the plasma. The concentration of titanium tetrachloride was 13.2% and the values of the variables determining the recirculation ratio were as follows: Mn=204 g/min; M=609 g/min; Rn=3 mm; R=55 mm; Dn=$6.5 \times 10^{-5}$ gcm$^{-3}$ and D=$3.6 \times 10^{-4}$ gcm$^{-3}$.

The recirculation ratio was 5.7.

The product, which was collected in a scrubber filter containing 10% HCl had a surface area (BET) of 17 meters squared per gram and contained 2.8 per cent by weight oxygen.

EXAMPLE 3

A d.c. plasma in nitrogen introducing heat energy at 333 kcal/min (23.3 k watts) into a reactor was established. Titanium tetrachloride at a rate of 1.7 mole per minute and ammonia gas at a rate of 3 mole per minute were fed into the area of the tail of the plasma. The concentration of tetrachloride was 15.4% and the values of the variables determining the recirculation ratio were as follows: Mn=88 g/min; M=552 g/min; Rn=3 mm; R=75 mm; Dn=$3.3 \times 10^{-5}$ gcm$^{-3}$ and D=$3.2 \times 10^{-4}$ gcm$^{-3}$.

The recirculation ratio was 4.8.

The product was collected in a scrubber filter containing 20% HCl, had a surface area (BET) of 23 meters squared per gram and contained 2.8 per cent by weight oxygen.

EXAMPLE 4

A d.c. plasma in nitrogen introducing heat energy at 630 kcal/min (44.1 k watts) into a reactor was established. Titanium tetrachloride at a rate of 1.4 mole per minute and ammonia gas at a rate of 4 mole per minute were fed into the area of the tail of the plasma.

The concentration of titanium tetrachloride was 12.1% and the values of the variables determining the recirculation ratio were as follows: Mn=146 g/min; M=508 g/min; Rn=8 mm; R=100 mm; Dn=$3.0 \times 10^{-5}$ gcm$^{-3}$ and D=$2.7 \times 10^{-4}$ gcm$^{-3}$.

The recirculation ratio was 4.1.

The product was collected in a scrubber filter containing 10% HCl, had a surface area (BET) of 21 meters square per gram and contained 3.6 per cent by weight oxygen.

EXAMPLE 5

A d.c. plasma in nitrogen introducing heat energy at 290 kcal/min (20.3 k watts) into a reactor was established. Titanium tetrachloride at a rate of 1.4 mole per minute and ammonia at 3 mole per minute were fed into the area of the tail of the plasma. The concentration of titanium tetrachloride was 18.9% and the values of the variables determining the recirculation ratio were as follows: Mn=56 g/min; M=401 g/min; Rn=8 mm; R=100 mm; Dn=$2.6 \times 10^{-5}$ gcm$^{-3}$ and D=$4.6 \times 10^{-4}$ gcm$^{-3}$.

The recirculation ratio was 2.7.

The product which was collected in a scrubber filter containing 10% HCl had a surface area (BET) of 38 meters squared per gram and contained 5.9 per cent by weight oxygen.

EXAMPLE 6

A d.c. plasma in argon introducing heat energy at 156 kcal/min (10.9 k watts) into a reactor was established. Titanium tetrachloride at a rate of 0.9 mole per minute, silicon tetrachloride at a rate of 0.1 mole per minute and ammonia at a rate of 3.5 mole per minute were fed into the area of the tail of the plasma. The concentration of tetrachlorides was 10.3 molar % and the values of the variables determining the recirculation ratio were as follows: Mn=208 g/min; M=479 g/min; Rn =3 mm; R=55 mm; Dn=$7.6 \times 10^{-5}$ gcm$^{-3}$ and D=$4.6 \times 10^{-4}$ gmc$^{31\ 3}$.

The recirculation ratio was 7.9.

The product was collected in a scrubber filter containing 10% HCl and was found to have a surface area (BET) of 26 meters squared per gram and to contain 3.1 per cent by weight oxygen and 2.9 per cent by weight silicon.

The following examples describe processes operating outside the parameters set and demonstrate the need to operate within the claimed parameters in order to obtain the desirable combination of a controlled fine particle size and an amount of oxygen within clearly defined limits.

EXAMPLE 7 (COMPARATIVE)

A d.c. plasma in argon introducing heat energy at the rate of 141 kcal/min (9.9 k watts) into a reactor was established Titanium tetrachloride at a rate of 0.8 mole per minute and ammonia gas at a rate of 1.6 mole per minute were fed into the area of the tail of the plasma. The concentration of titanium tetrachloride was 6.0% and the values of the variables determining the circulation ratio were as follows: Mn=92 g/min; M=615 g/min; Rn=3 mm; R=25 mm; Dn=$3.9 \times 10^{-5}$ gcm$^{-3}$ and D=$4.0 \times 10^{-4}$ gcm$^{-3}$.

The recirculation ratio was 1.3.

The product, which was collected in a polytetrafluoroethylene fabric filter bag, had a surface area (BET) of 99 meters squared per gram and contained 13.5 per cent by weight oxygen.

Pressureless sintering of this product under nitrogen at 1600° C. for 30 minutes produced a body which was only 45% dense and a dull light brown in colour.

EXAMPE 10 (COMPARATIVE)

A d.c. plasma in argon introducing heat energy at the rate of 110 kcal/min (7.7 k watts) into a reactor was established. Titanium tetrachloride at a rate of 0.5 mole per minute and ammonia gas at a rate of 1.0 mole per minute were fed into the area of the tail of the plasma. The concentration of titanium tetrachloride was 5.5% and the value of the variables determining the recirculation ratio were as follows: Mn=104 g/min; M=416 g/min; Rn=3 mm; R=25 mm; Dn=$5.5 \times 10^{-5}$ gcm$^{-3}$ and D=$4.5 \times 10^{-4}$ gcm$^{-3}$.

The recirculation ratio was 2.1.

The product, which was collected in a polytetrafluoroethylene fabric filter bag, had a surface area (BET) of 71 meters squared per gram and contained 10.3 per cent by weight oxygen.

We claim:

1. A method for the manufacture of black titanium nitride which comprises (a) heating ammonia and a halide of titanium to a chosen reaction temperature by means of an electric plasma formed in a stream of non-oxidising gas generated by the discharge of direct current electricity between a pair of electrodes, (b) introducing said heated gas through an inlet nozzle into a reactor and said reactor being so constructed and operated so as to induce circulation of the gaseous material in said reactor such that the recirculation ratio (RR) is greater than 2.5 and (c) collecting a black titanium nitride powder in which method the recirculation ratio is defined according to the formula:

$$RR = \frac{0.425 \, Mn \cdot R}{M \cdot Rn} \left[ \frac{D}{Dn} \right]^{\frac{1}{2}} - 0.425$$

wherein

Mn = mass flow of gas stream through inlet nozzle

R = internal radius of the reactor into which said nozzle flows

M = mass flow at a distance 4R downstream from the inlet nozzle

Rn = radius of inlet nozzle

Dn = density of gas stream passing through the inlet nozzle

D = density of gases in reactor at a distance 4R downstream from the inlet nozzle.

2. A process according to claim 1 in which the concentration of the said titanium halide, without considering reaction or dissociation lies in the range 5 to 30 molar % with respect to the total gas system.

3. A process according to claim 1 in which the concentration of the said titanium halide lies in the range 7 to 25%.

4. A process according to claim 1 in which the said titanium halide is titanium tetrachloride.

5. A process according to claim 1 in which the net power provided in the plasma is from 50 to 500 kcals per minute per mole of titanium halide.

6. A process according to claim 1 in which the said non-oxidising gas is argon and said plasma is generated by a d.c. voltage of from 25 to 50 volts and a current of 200 to 600 amperes.

7. A process according to claim 1 in which the said non-oxidising gas is nitrogen or hydrogen and said plasma is generated by a d.c. voltage of from 90 to 250 volts and a current of from 80 to 250 amps.

8. A process according to claim 1 in which the said d.c. voltage is from 90 to 220 volts.

9. A process according to claim 1 in which the mass flow rate of titanium halide is from 0.1 to 5.0 mole per minute.

10. A process according to claim 1 in which the mass flow rate of ammonia is from 0.2 to 50.0 mole per minute.

11. A process according to claim 1 wherein the recirculation ratio is not greater than 10.

12. A process according to claim 1 wherein the recirculation ratio is from 3 to 9 inclusive.

* * * * *